United States Patent

Oelsch et al.

[11] 3,902,063
[45] Aug. 26, 1975

[54] ADJUSTMENT OF PHASE DETECTION IN PHOTOELECTRIC SENSOR HEAD

[75] Inventors: Kurt Oelsch, Glockenstrabe; Klaus-Dieter Schulz, Leinestrabe, both of Germany

[73] Assignee: Fernsteuergerate, Kurt Oelsch KG, Berlin, Germany

[22] Filed: Aug. 5, 1974

[21] Appl. No.: 495,033

[30] Foreign Application Priority Data
Aug. 7, 1973 Germany............... 23398745

[52] U.S. Cl........... 250/233; 250/231 SE; 250/234; 250/578
[51] Int. Cl.²................................. G01D 5/36
[58] Field of Search... 250/233, 236, 231 SE, 231 R, 250/200, 239, 578, 234; 356/28; 340/271

[56] References Cited
UNITED STATES PATENTS
2,685,082  7/1954  Beman et al............. 250/233 X
3,770,971  11/1973  Somerset.............. 250/231 SE Primary Examiner—James W. Lawrence
Assistant Examiner—E. R. LaRoche
Attorney, Agent, or Firm—Darbo, Robertson & Vandenburgh

[57] ABSTRACT

A body has arcuate slots through which mounting screws extend so that the body can be clamped in various locations along an arcuate path about a pivot point. Four arms are adjustably secured to the body. One pair of arms positioned in a first plane hold respective light sources. A second pair of arms positioned in a second plane parallel to, and spaced from, the first plane hold respective detectors. In the space between the light sources and the detectors is the edge of a rotating disc. The disc edge has radially positioned light transmitting areas so that the detectors each produce pulse trains. The detectors are positioned so that the pulse trains are out of phase with each other. By pivoting the body the phase relationship may be changed.

7 Claims, 4 Drawing Figures

3,902,063

1

ADJUSTMENT OF PHASE DETECTION IN PHOTOELECTRIC SENSOR HEAD

BACKGROUND AND SUMMARY OF THE INVENTION

This invention relates to a photoelectric sensor head for an incremental angular position pick-off comprising: a pair of sensors, each of which includes a light source and a photoelectric detector spaced therefrom, the edge portion of a rotatable disc, which has a light modulating structure, extending between said sources and detectors such that two out-of-phase pulse trains are produced by said sensors when said light modulating structure moves past the sensors.

In incremental angular position pick-offs, one pulse is associated with each angle increment and the angular position of the disc is indicated by the total number of the pulses counted from a zero position. The movement of the disc into its final position comprises, in general, a transient oscillation. Thus, in a bidirectional counter it is necessary to provide a direction discriminator which causes a reversal of the direction of the pulse counting when the direction of movement of the disc is reversed. Such a direction discriminator, which is well known in the art, picks off two pulse trains from said disc, which pulse trains are a quarter period out of phase. Depending on the direction of movement of the disc, either one or the other pulse train is leading, and, correspondingly, counting pulses will appear at one or the other output of the direction discriminator and will be applied to the up or down input of the bidirectional counter.

In order to produce these two pulse trains, two sensors have been provided, each of which comprises a light source and a photoelectric detector with the two light beams being chopped by an apertured disc. These sensors are angularly offset relative to each other to generate the required quarter period out of phase pulse trains. In prior art sensor heads this presents considerable problems. In order to achieve a sufficiently high resolution, the apertures or the like in the disc must be closely spaced. The distance between adjacent apertures corresponds to one complete period. In practice, structural considerations prevent placing two sensors side-by-side (in circumferential direction) with a spacing of a quarter period. In prior art sensor heads of this type, the sensors have been angularly spaced by a distance corresponding to a quarter period plus an integral multiple of a period. Thereby associated pulses, angularly offset by a quarter period, are caused by different apertures. Even with high precision of manufacture a certain tumbler or nutating movement of the disc relative to the sensor head is inevitable. This results in a phase shift of the pulses, and as the two pulse trains are picked off from different portions of the disc circumference, these phase shifts caused by the tumbler movement may be different in the two pulse trains. This, in turn, may result in the phase difference between two associated pulses clearly deviating from a quarter period. Consequently the direction discriminator may produce erroneous counting pulses.

It is an object of the invention to provide a sensor head of the type initially described in which both pulse trains are picked off substantially from the same portions of the circumference of the disc.

In accordance with the invention, the sensors are mounted on a common support, which can be rotated about a pivot point between the sensors and secured in a selected rotational position. The light modulating structure comprises a pattern of straight radial transparent areas, e.g. slots. One sensor is positioned to respond to the radially inner portions of the transparent areas and the other sensor is positioned to respond to the radially outer portions of said areas.

In this manner each pair of associated pulses a quarter period out of phase is caused by one common transparent area of the disc, whereby the tumbler movement of the disc cannot affect the relative phase of the two impulses. The two sensors are offset radially with respect to the disc, whereby their finite dimensions do not prevent them from being angularly offset by only a very small amount. This angular offset with respect to the axis of the disc can easily be provided and adjusted by limited rotation of the support about the pivot point located between the sensors.

DESCRIPTION OF SPECIFIC EMBODIMENT

Figure 1:
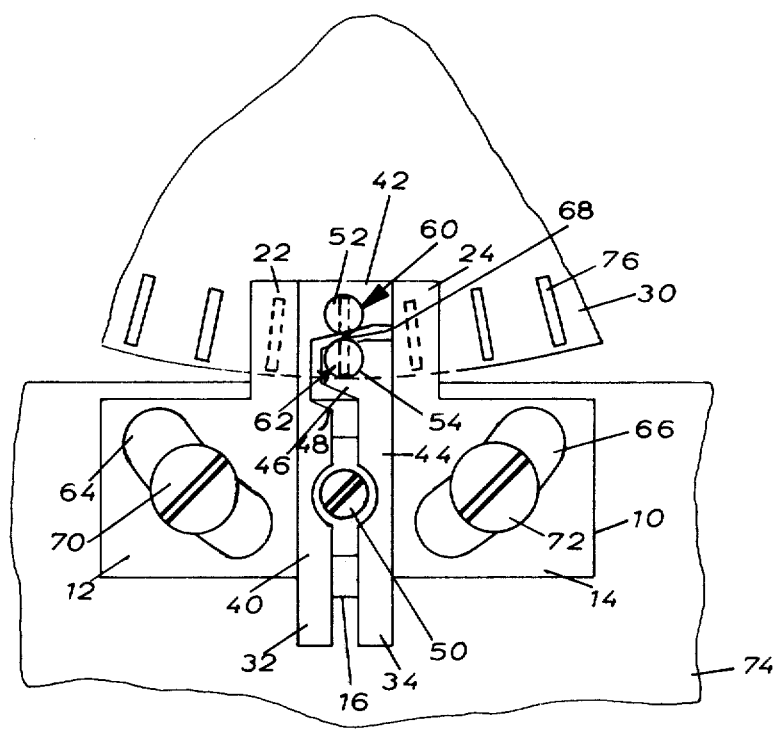
FIG. 1 is a plan view of an embodiment of the invention with the sensor head centrally positioned.

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

A support 10 includes a body formed by two block-shaped halves 12 and 14 interconnected by a narrow center portion 16. Channel-shaped recesses 18, 20 are formed above and below this center portion between to two the On both sides of these recesses the body has projecting guide ledges 22, 24 extending through the whole height of the halves 12 and 14. A horizontal slot 26 extends across the middle of the guide ledges 22, 24 and part of the two halves 12 and 14. The edge portion of a disc 30 to be picked-off extends into slot 26.

Above the center portion 16 in the channel-shaped recess 18 is a pair of flat arms 32, 34, respectively, positioned in a first plane. In the lower recess 20 is a second pair of arms 36, 38, respectively, also positioned in a plane parallel to the plane of arms 32, 34. The arms of the two pairs are substantially identical, and therefore only the upper pair 32, 34 visible in FIG. 1 will be described. The arm 32 is flat and comprises an elongated, straight portion 40. At its distal end, the arm has a projection 42 extending transversely from the straight portion toward the other arm. The arm 34 is also flat and comprises an elongated, straight portion 44 and, at its distal end, a projection 46 extends transversely from the straight portion toward the other arm. The arm 34 is shorter than the arm 32. Projection 42 of arm 32 extends across the end of arm 34, and projection 46 of arm 34 extends into a recess 48 of arm 32 substantially complementary thereto but permitting some clearance.

Thus a central plane normal to the plane of arms 32, 34 (i.e. vertical to the plane of the paper in FIG. 1) will intersect both projections 42 and 46. The arms 32 and 34 are adjustably secured to the center portion 16 by a clamping screw 50 so as to permit adjustment of the arms 32, 34 with respect to each other and to the support 10.

Figure 4:
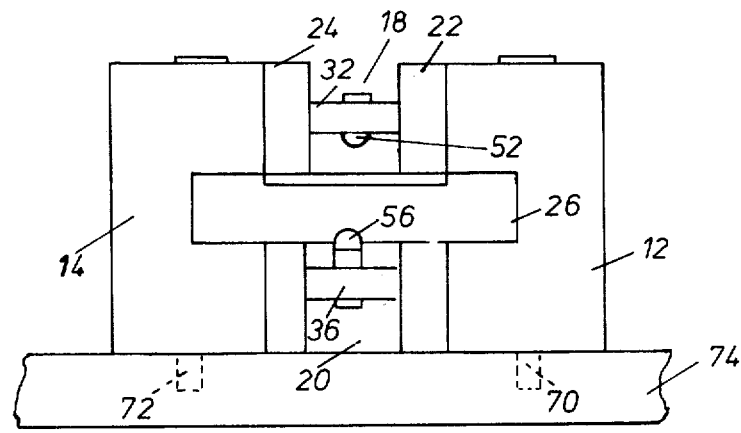
FIG. 4 is an end view of the sensor head as viewed from the disc.

Light sources 52 and 54 are carried by the projections 42 and 46 of the arms 32 and 34, respectively, substantially in the longitudinal central plane between the arms 32 and 34. The light sources 52 and 54 emit downwardly directed light beams (as viewed in FIG. 4) which traverse the slot 26 and impinge upon photoelectric detectors 56, 58 mounted on the lower arms 36, 38 respectively. Detectors 56, 58 are in vertical alignment with the light sources 52, 54 as viewed in FIG. 1 and are arranged one behind the other as viewed in FIG. 4, so that only detector 56 is visible in that figure. Scattered light stops can be placed in front of the light sources. Each light source 52 and 54 and the respective detector 56 and 58 aligned therewith makes up a photoelectric sensor generally 60 and 62 respectively.

The two halves 12 and 14 of support 10 have arcuate slots 64 and 66, respectively, which are curved about a pivot point 68 intermediate, and preferably halfway between, the light sources 52 and 54. Clamping screws 70, 72, which are screwed into a base 74, extend through the slots 64 and 66, respectively. These clamping screws 70, 72 guide the support 10 for rotation about the pivot point 68. When tightened they secure the support in a desired angular position.

Disc 30 has a plurality of radial slots 76 spaced regularly along its periphery. Instead of the radial slots 76 the disc 30 may be provided with some other kind of straight, radial transparent areas, which may, for example, have been produced by photographic methods. Thus the disc chops the two light beams so that detectors 26, 28 each produce a train of electrical pulses.

In FIG. 1 the support 10 is shown in its central position. In this position the clamping screws 70 and 72 are located in the middle of the respective slots 64, 66. Thus, the longitudinal central plane between the upper pair of arms 32, 34 (and correspondingly between the lower pair of arms 36, 38) is radial to the axis of rotation of the disc 30, as are the slots 76. Therefore, with rotation of the disc 30, the slots 76 pass by both sensors 60 and 62 simultaneously, the sensors being located in this longitudinal central plane. In this situation the two light beams would be chopped simultaneously and the pulse trains from the detectors 56, 58 would be in phase. The sensor 60 comprising light source 52 and photoelectric detector 56 is positioned to respond to the radially inner portion of each slot 76. The sensor 62 comprising light source 54 and photoelectric detector 58 is positioned to respond to the radially outer portion of each slot 76.

Figure 2:
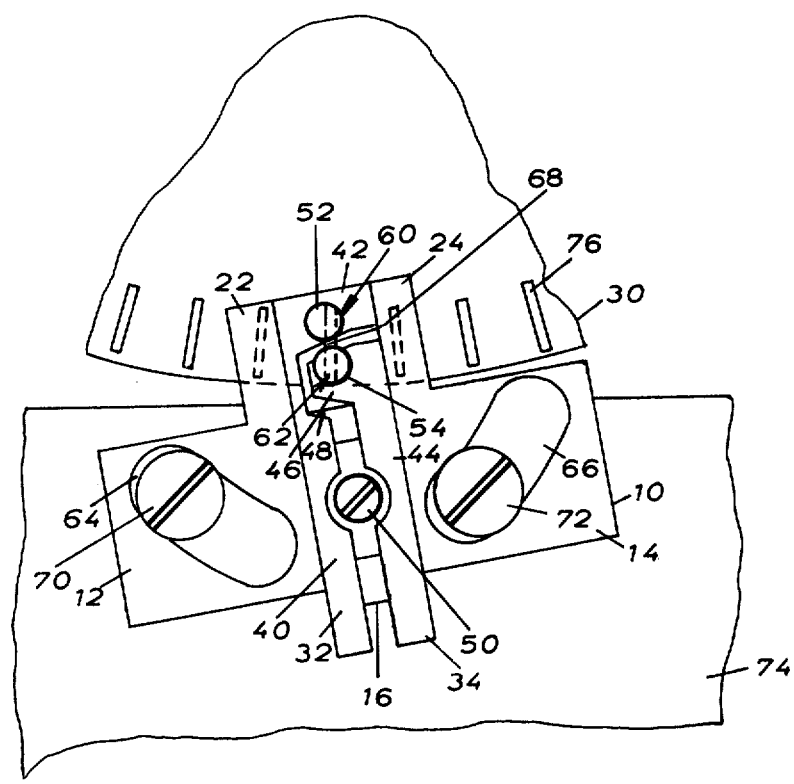
FIG. 2 is a view corresponding to FIG. 1, but with the sensor head support rotated to achieve a phase shift between the two pulse trains.
Figure 3:
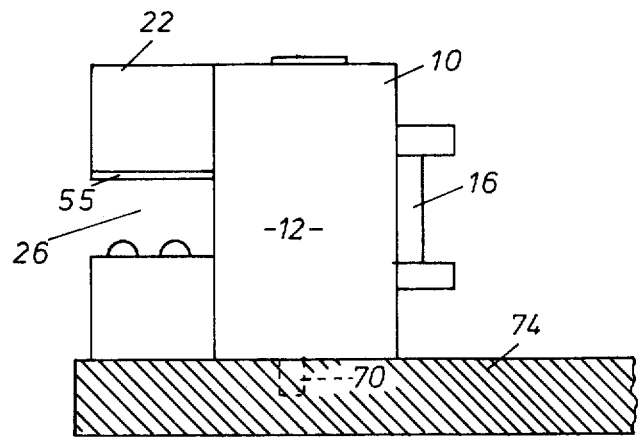
FIG. 3 is a side elevational view of the sensor head of FIG. 1.

For the control for a directional discriminator one pulse train must be a quarter period out of phase with respect to the other one. This is achieved by rotating the support 10 relative to the clamping screws 70 and 72 to a position such as that shown in FIG. 2. If disc 30, for example, rotates clockwise, a certain slot 76 will at first be picked-up by sensor 62 and subsequently by sensor 60. Thus the sensors will produce out-of-phase pulse trains, the pulse train from sensor 60 lagging with respect to that from sensor 62. With a counterclockwise rotational movement of disc 30 the pulse train from sensor 62 will lag the pulse train from sensor 60 by the same amount. By suitable adjustment of support 10 the phase difference can be made to be just a quarter period, whereby the direction discriminator produces correct counting pulses. By rotating the support 10 in opposite direction from that shown in FIG. 2, the described functions of the sensors 60 and 62 can be interchanged.

We claim:

1. In a photoelectric sensor head for an incremental angular position pick-off including a pair of sensors, each sensor including a light source and a photoelectric detector, said detector and light source being positioned to define a space therebetween, a rotatable disc having an edge portion positioned in the space between the light sources and the detectors, said edge portion having light modulating means whereby each detector produces an electrical pulse train as said disc rotates, said sensors being arranged so that said pulse trains are out of phase with respect to each other, the improvement comprising:

a common support for said sensors; and means mounting said support for movement in an arcuate path about a pivot point between the sensors and for releasably affixing said support at desired locations in said path;

said light modulating means comprising a pattern of straight, radial transparent areas having radially inner portions and radially outer portions;

one of said sensors being positioned with its space coincident with the inner portions and the other of said sensors being positioned with its space coincident with the outer portions.

2. In a sensor head as set forth in claim 1, wherein said support includes a body and two arm means, said arm means being adjustably secured to said body, each sensor being secured to a respective arm means, said means mounting said support for movement in said path being connected to said body.

3. In a sensor head as set forth in claim 2, wherein said arm means comprise four arms, a first pair of said arms being positioned in a first common plane and a second pair of said arms being positioned in a second common plane parallel to said first plane, said arms having distal ends with transverse projections thereon, said projections of each arm of each pair extending toward the other arm of the pair and across a plane transverse to said common planes, said light sources being on the projections of the first arms and approximately in said transverse plane, said detectors being on the projections of the second arms and approximately in said transverse plane.

4. In a sensor head as set forth in claim 3, wherein said body has arcuate slots curved about said pivot point, said mounting means including a base plate and two clamping screws extending through said slots and engaging said base plate.

5. In a sensor head as set forth in claim 1, wherein said support has arcuate slots curved about said pivot point, said mounting means including a base plate and two clamping screws extending through said slots and engaging said base plate.

6. In a sensor head as set forth in claim 5, wherein said support includes a body and two arm means, said arm means being adjustably secured to said body, each sensor being secured to a respective arm means, said means mounting said support for movement in said path being connected to said body.

7. In a photoelectric sensor head for an incremental angular position pick-off including a support device, a pair of sensors on said support device, each sensor including a light source and a photoelectric detector, said detector and light source being positioned to define a space therebetween, a rotatable disc having an edge portion positioned in the space between the light sources and the detectors, said edge portion having light modulating means whereby each detector produces an electrical pulse train as said disc rotates, said sensors being arranged so that said pulse trains are out of phase with respect to each other, said light modulating means comprising a pattern of straight, radial transparent areas having radially inner portions and radially outer portions, said sensors being positioned in immediate juxtaposition with the space of one of said sensors on a radial line of said disc and coincident with said inner portion of one of said areas and with the space of the other of said sensors offset from said radial line and coincident with the outer portions of said one of said areas, the improvement comprising:

said support device including means for releasably affixing said sensors in place and, when released, guiding said sensors along respective paths transverse to said radial line and restricting the movement of the sensors to movements in opposite directions with respect to said radial line, whereby the phase difference between the pulse train produced by said sensors may be varied.

* * * * *